United States Patent
Kong et al.

(10) Patent No.: US 10,346,948 B2
(45) Date of Patent: Jul. 9, 2019

(54) GRAPHICS PROCESSING METHOD AND DEVICE

(71) Applicant: Shanghai Zhaoxin Semiconductor Co., Ltd., Shanghai (CN)

(72) Inventors: Weiman Kong, Beijing (CN); Yuanyuan Wang, Beijing (CN); Yuwei Gu, Beijing (CN)

(73) Assignee: SHANGHAI ZHAOXIN SEMICONDUCTOR CO., LTD., Shanghai (CN)

( * ) Notice: Subject to any disclaimer, the term of this patent is extended or adjusted under 35 U.S.C. 154(b) by 0 days.

(21) Appl. No.: 15/814,709

(22) Filed: Nov. 16, 2017

(65) Prior Publication Data

US 2019/0122328 A1    Apr. 25, 2019

(30) Foreign Application Priority Data

Oct. 20, 2017    (CN) .......................... 2017 1 0983477

(51) Int. Cl.
| | |
|---|---|
| *G06T 1/60* | (2006.01) |
| *H04N 19/423* | (2014.01) |
| *G06F 3/06* | (2006.01) |
| *G06F 9/30* | (2018.01) |
| *G06T 1/00* | (2006.01) |
| *G06T 1/20* | (2006.01) |

(52) U.S. Cl.
CPC .................. *G06T 1/60* (2013.01); *G06F 3/06* (2013.01); *G06F 9/30* (2013.01); *G06F 9/30036* (2013.01); *G06T 1/00* (2013.01); *G06T 1/0007* (2013.01); *G06T 1/20* (2013.01); *H04N 19/423* (2014.11); *G06F 2003/0691* (2013.01)

(58) Field of Classification Search
CPC ......... G06T 1/60; G06T 7/246; H04N 19/433; H04N 1/3876; G06F 13/28; G06F 12/0623

See application file for complete search history.

(56) References Cited

U.S. PATENT DOCUMENTS

2005/0052463 A1* 3/2005 Hung ........................ G06T 1/60
                                                                            345/531
2017/0249717 A1* 8/2017 Meixner ................ G06F 9/3887

FOREIGN PATENT DOCUMENTS

| EP | 1 895 470 A2 | 3/2008 |
|---|---|---|
| EP | 2 211 303 A1 | 7/2010 |

OTHER PUBLICATIONS

European Search Report dated Mar. 20, 2018, issued in application No. 17207280.3-1210.

(Continued)

*Primary Examiner* — Hau H Nguyen
(74) *Attorney, Agent, or Firm* — McClure, Qualey & Rodack, LLP (57) ABSTRACT

A technique for graphics processing, which completes graphics processing of an image loaded from a system memory by performing a series of slice processing steps. A device for graphics processing has an internal vector dynamic memory for buffering slices of pixel data loaded from the system memory. The internal vector dynamic memory has a first buffer for buffering non-overlapped pixel data, which is not reused in a next slice processing step and a second buffer for buffering overlapped pixel data, which is reused in the next slice processing step.

19 Claims, 6 Drawing Sheets

(56) References Cited

OTHER PUBLICATIONS

Tuan, J.C., et al.; "On the data reuse and memory bandwidth analysis for full-search block-matching VLSI architecture;" IEEE Transactions on Circuits and Systems for Video Technology; vol. 12; No. 1; Jan. 2002; pp. 61-72.

Sahuquillo, J., et al.; "Splitting the data cache: a survey;" IEEE Concurrency; Jul. 2000; pp. 30-35.

* cited by examiner

GRAPHICS PROCESSING METHOD AND DEVICE

CROSS REFERENCE TO RELATED APPLICATIONS

This Application claims priority of China Patent Application No. 201710983477.X, filed on Oct. 20, 2017, the entirety of which is incorporated by reference herein.

BACKGROUND OF THE INVENTION

Field of the Invention

The present invention relates to graphics processing techniques.

Description of the Related Art

A graphics processing unit (GPU) is typically used for image processing on personal computers, workstations, game consoles, and some mobile devices (such as tablet PCs, smartphones, etc.), involving frequently capturing and processing image content. It is a vitally important issue in the graphics processing field to capture image content using less system overhead.

BRIEF SUMMARY OF THE INVENTION

A graphics processing unit in accordance with an exemplary embodiment of the disclosure has an internal vector dynamic memory and an arithmetic logic unit. The internal vector dynamic memory buffers a slice of pixel data of a plurality of slices of pixel data of an image loaded from a system memory, wherein the slice of pixel data includes non-overlapped pixel data and overlapped pixel data. The arithmetic logic unit performs a current slice processing corresponding to the slice of pixel data buffered by the internal vector dynamic memory. The graphics processing unit performs a series of slice processing steps to complete graphics processing of the plurality of slices of pixel data of the image loaded from the system memory. The internal vector dynamic memory includes a first buffer and a second buffer. The first buffer is configured to buffer the non-overlapped pixel data, which is not reused in a next slice processing step corresponding to a next slice of pixel data. The second buffer is configured to buffer the overlapped pixel data, which is reused in the next slice processing step corresponding to the next slice of pixel data.

In another exemplary embodiment, a method for graphics processing comprises: providing an internal vector dynamic memory within a graphics processing unit to buffer one slice of pixel data of a plurality of slices of pixel data of an image loaded from a system memory, wherein the slice of pixel data includes non-overlapped pixel data and overlapped pixel data; and performing a current slice processing step corresponding to the slice of pixel data buffered by the internal vector dynamic memory. A series of slice processing steps may be performed to complete graphics processing of the plurality of slices of pixel data of the image loaded from the system memory. The internal vector dynamic memory includes a first buffer and a second buffer. The first buffer is configured to buffer the non-overlapped pixel data, which is not reused in a next slice processing step corresponding to the next slice of pixel data. The second buffer is configured to buffer the overlapped pixel data, which is reused in the next slice processing step corresponding to the next slice of pixel data.

In an exemplary embodiment, a first slice processing step is performed prior to a second slice processing step. When performing the second slice processing step, part of the pixel data stored in the second buffer is used in both the first slice processing step and second slice processing step, and the pixel data stored in the first buffer is not used in the first slice processing step.

Pixel data is buffered by the first buffer or the second buffer depending on its image coordinate in the image.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows exemplary embodiments of carrying out the invention. This description is made for the purpose of illustrating the general principles of the invention and should not be taken in a limiting sense. The scope of the invention is best determined by reference to the appended claims.

A window used for a window processing, wherein the window processing is commonly used in image processing. A destination pixel is obtained according to the pixels within the window. For example, if adopting a 5×5 window or a 5×5 filter kernel (i.e. the height and the width of the window or the kernel are 5) for the window calculation to generate a destination pixel, an edge may exist around the kernel center (i.e., the center of the window, where the destination pixel locates), and the edge is 2 pixels in width or in height. For another example, if adopting a 3×3 window or a 3×3 filter kernel, the edge around the kernel center is 1 pixel in width or in height. In general, the edge may be determined by dividing the width or height of the window by 2 and may be rounded.

Figure 1:
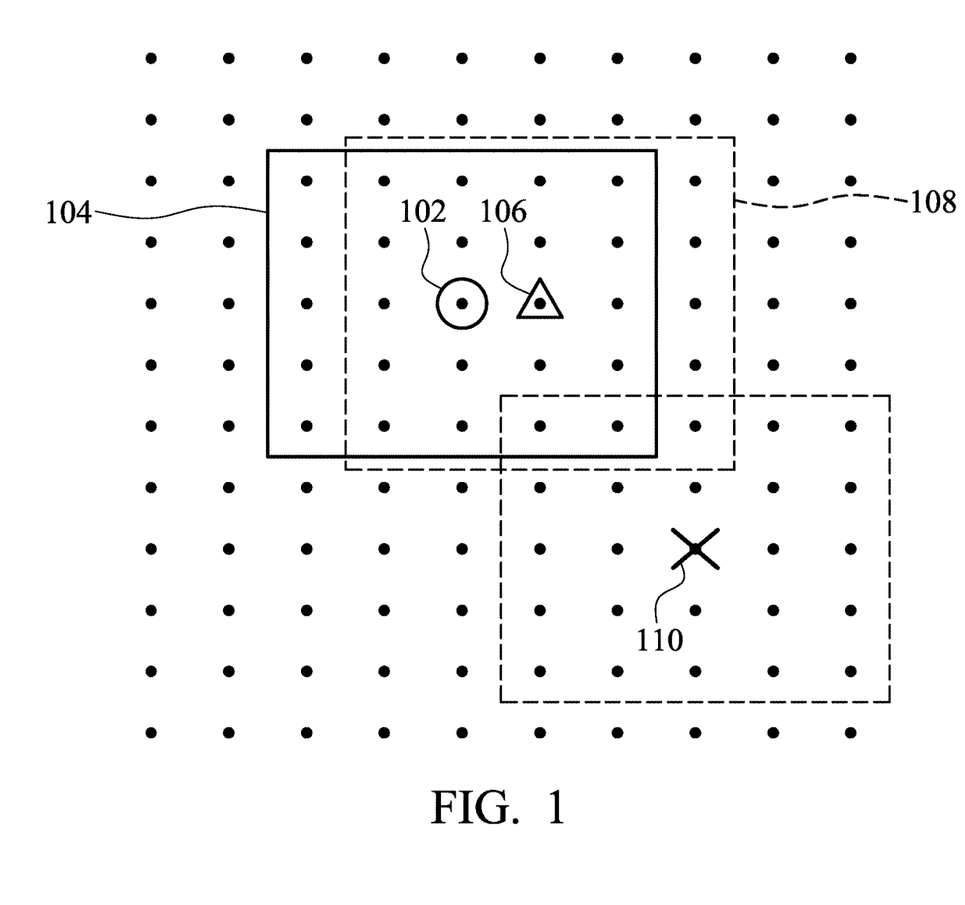
FIG. 1 illustrates a window processing in accordance with an exemplary embodiment of the disclosure.

FIG. 1 shows a window processing based on a 5×5 window in accordance with an exemplary embodiment of the disclosure. For example, the destination pixel may be obtained based on all pixels within the 5×5 window. A destination pixel 102 is a center pixel of the window, which is obtained by performing filtering processing (one method of the window calculation) based on the pixels within a window 104. A destination pixel 106 is obtained by performing filtering processing based on the pixels within a window 108. The pixel data used for generating the pixel 102 and the pixel 106 appears to be partially overlapping. Other pixels (e.g. pixel 110) farther away from the pixel 102 may also need part of the pixel data used in filtering processing to obtain the pixel 102. The aim of the disclosure is to avoid frequently loading the overlapped pixel data to the buffers of the GPU (graphics processing unit) or VPU (vision processing unit) or DSP (digital signal processing unit). The buffer size of the buffers is specially designed.

Figure 2:
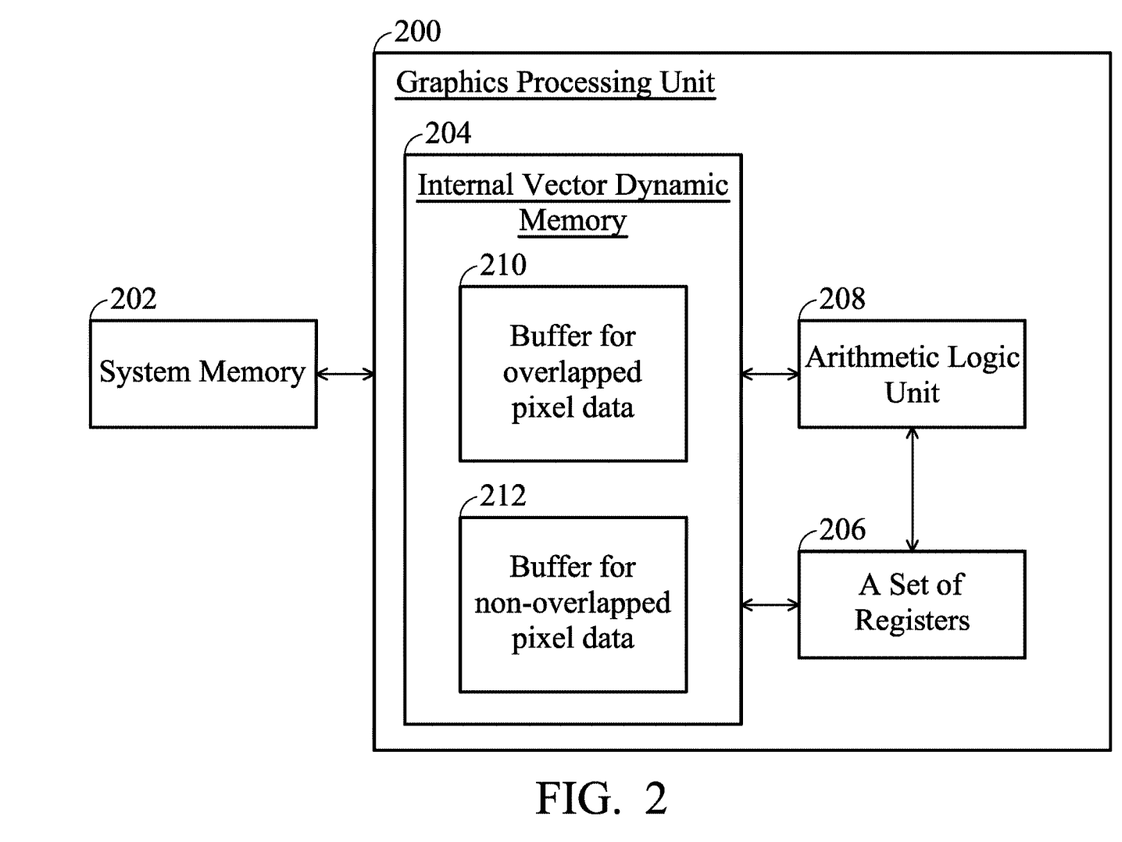
FIG. 2 is a block diagram depicting a graphics processing unit 200 in accordance with an exemplary embodiment of the disclosure.

FIG. 2 is a block diagram depicting a graphics processing unit 200, which loads images from a system memory 202 for graphics processing. The images may be photos or frames of a video.

The graphics processing unit 200 includes an internal vector dynamic memory (IVDM) 204, a set of registers 206, and an arithmetic logic unit (ALU) 208. The graphics processing unit 200 outputs a DMA (direct memory access) request to access the system memory 202. In response, the system memory 202 output data to the graphics processing unit 200. The data outputted from the system memory 202 is firstly buffered in the IVDM 204 and then loaded into the set of registers 206. The ALU 208 performs graphics processing based on the data in the set of registers 206. The IVDM 204 may be an internal memory within the graphics processing unit 200 or be replaced by other storage devices. In some exemplary embodiments, the ALU 208 accesses pixel data from the IVDM 204 rather than from the set of registers 206.

More specifically, the IVDM 204 includes a buffer 210 for overlapped pixel data and a buffer 212 for non-overlapped pixel data. The different buffers 210 and 212 are separately configured to buffer the different types of pixel data between different slice processing steps. The buffer 212 for non-overlapped pixel data may be understood as the first buffer and the buffer 210 for overlapped pixel data may be understood as the second buffer. For example, the pixel data may be categorized according to the pixel coordinates and buffered by the different buffers 210 and 212. Pixel data of an image retrieved from the system memory 202 may be divided into different sets of data and stored to the internal memory (e.g. the buffer 210 and the buffer 212) of the graphics processing unit 200. For example, the pixel data of an image may be divided into different slices and each slice of pixel data include overlapped pixel data and non-overlapped pixel data. More specifically, the overlapped pixel data and the non-overlapped pixel data of each slice are separately divided (e.g. according to the window height) into a plurality of pixel blocks. The graphics processing for one slice is named as a slice processing step. The overlapped pixel data reused in the different slice processing steps corresponding to different slices is buffered by the buffer 210. The non-overlapped pixel data, which is not reused in the different slice processing steps corresponding to different slices, is buffered by the buffer 212. In this manner, the buffer for the overlapped pixel data and the buffer for the non-overlapped pixel data are managed separately. The overlapped pixel data that will be reused in the next slice processing step(s) is maintained in the buffer 210. The buffer 210 may just store the reused part of rows of pixel data adjacent in two slices (if an image having more rows than columns, generally to be sliced horizontally) or of columns of pixel data adjacent in two slices (if an image having more rows than columns, generally to be sliced vertically). In this manner, there is no need to repeatedly retrieve the same pixel data from the system memory 202. The buffer 212 only buffer the pixel data, which is not reused in the next slice processing step(s), therefore, the size of the buffer 212 can be designed small.

Figure 3:
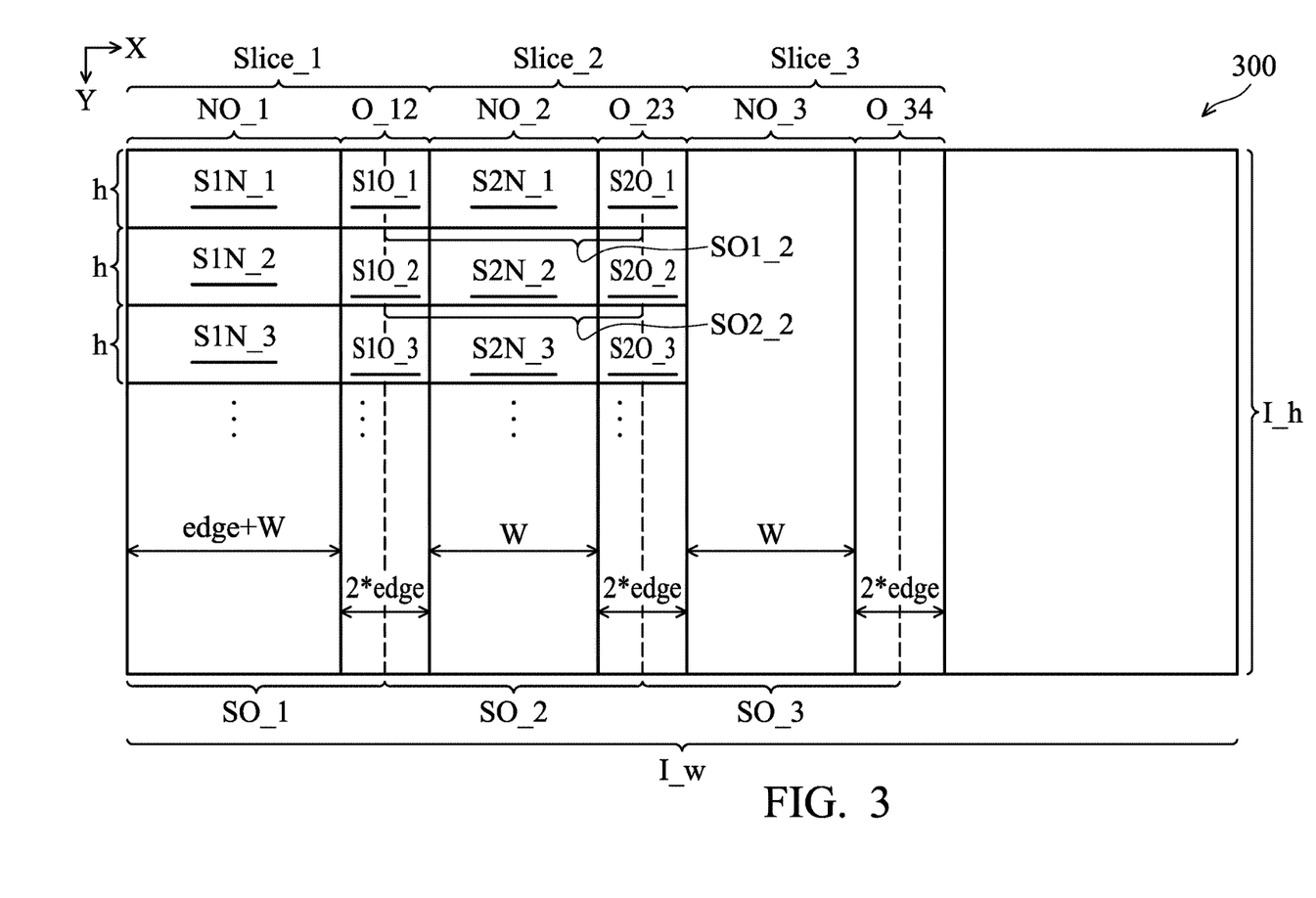
FIG. 3 illustrates the slices (Slice_1, Slice_2, Slice_3 . . . ) of an image 300, destination pixels (SO_1, SO_2, SO_3 . . . ) generated by slice processing, overlapped pixel data (O_12, O_23, O_34 . . . ) and non-overlapped pixel data (NO_1, NO_2, NO_3 . . . ) in accordance with an exemplary embodiment of the disclosure.

FIG. 3 illustrates an image 300 to be sliced vertically into slices of pixel data, which are numbered as Slice_1, Slice_2, Slice_3 and so on. The image 300 contains I_h rows (I_h is the height of the image 300) along the y axis and I_w columns (I_w is the width of the image 300) along the x axis. A complete image stored in the system memory 202 is sliced into slices of pixel data. Each time the graphics processing unit 200 retrieves pixel data from the system memory 202 to the internal memory (buffer 210 or 212), the retrieved pixel data belongs to the same slice. As shown in FIG. 3, the image 300 is divided into slices (Slice_1, Slice_2, Slice_3 . . . ) and further divided into non-overlapped pixel data (NO_1, NO_2, NO_3 . . . ) and overlapped pixel data (O_12, O_23, O_34 . . . ). In some exemplary embodiments, the overlapped pixel data (O_12, O_23, O_34 . . . ) and the non-overlapped pixel data may be further divided into a smaller size (pixel block in the window height h). The non-overlapped NO_1 is divided into non-overlapped pixel blocks S1N_1, S1N_2, S1N_3, and so on. The non-overlapped NO_2 is divided into non-overlapped pixel blocks S2N_1, S2N_2, S2N_3, and so on. The overlapped O_12 is divided into overlapped pixel blocks S1O_1, S1O_2, S1O_3, and so on. The overlapped O_23 is divided into overlapped pixel blocks S2O_1, S2O_2, S2O_3, and so on. The slice processing step refers to the graphics processing performed to corresponding each slice (Slice_1, Slice_2, Slice_3 . . . ) to generate the destination pixels (SO_1, SO_2, SO_3 . . . ). The slice processing step may be completed by performing a series of block processing operations to the non-overlapped pixel blocks and the overlapped pixel blocks. As shown, a block processing operation may be performed based on the block pixels S1O_1, S2N_1 and S2O_1 to generate a block SO1_2 with a plurality of destination pixels, and a block processing operation may be performed based on the block pixels S1O_2, S2N_2 and S2O_2 to generate a block SO2_2 with a plurality of destination pixels. For the image 300 are divided into slices (Slice_1, Slice_2, Slice_3 . . . ) along the x axis, a window processing performed by the architecture of FIG. 1 is adopted in the following paragraphs.

A first slice processing step is performed corresponding to the first slice Slice_1 of pixel data to generate destination pixels SO_1. The first slice Slice_1 includes non-overlapped pixel data NO_1 (to be buffered in the buffer 212) and overlapped pixel data O_12 (to be buffered in the buffer 210). After the first slice processing step corresponding to the first slice Slice_1 of pixel data is performed and the destination pixels SO_1 are generated, the non-overlapped pixel data NO_1 in the buffer 212 will be all cleared, and the buffer 212 is updated to buffer the non-overlapped pixel data NO_2, the overlapped pixel data O_12 (in a width of 2*edge) is maintained in the buffer 210 and the overlapped pixel data O_23 (in a width of 2*edge of the next slice Slice_2) is also buffered in the buffer 210. A second slice processing step is performed corresponding to the second slice Slice_2 of pixel data to generate destination pixels SO_2. The second slice Slice_2 includes non-overlapped pixel data NO_2 (to be buffered in the buffer 212) and overlapped pixel data O_23 (to be buffered in the buffer 210). After the second slice processing step corresponding to the second slice Slice_2 of pixel data is performed and the destination pixels SO_2 are generated, the non-overlapped pixel data NO_2 in the buffer 212 and the overlapped pixel data O_12 (in a width of 2*edge, and buffered in the buffer 210) have been all cleared. When the buffer 212 is updated to buffer the non-overlapped pixel data NO_3, the overlapped pixel data O_23 (in a width of 2*edge) is maintained in the buffer 210 and the overlapped pixel data O_34 (in a width of 2*edge of the next slice Slice_3) is also buffered in the buffer 210. A third slice processing step corresponding to the third slice Slice_3 is performed based on the pixel data buffered in the buffers 212 and 210 to generate destination pixels SO_3. Similarly, the third slice Slice_3 includes non-overlapped pixel data NO_3 (to be buffered in the buffer 212), which is not reused in the next slice processing step and overlapped pixel data O_34 (to be buffered in the buffer 210), which will be reused in next slice processing step performed corresponding to the next slice. After the slice processing step corresponding to the third slice Slice_3 of pixel data is performed and the destination pixels SO_3 are generated, the non-overlapped pixel data NO_3 in the buffer 212 and the overlapped pixel data O_23 in a width of 2*edge in the buffer 210 have been all cleared. When the buffer 212 is updated to buffer the non-overlapped pixel data of the next slice, the overlapped pixel data O_34 in a width of 2*edge is maintained in the buffer 210 and the overlapped pixel data (in a width of 2*edge) of the next slice is also buffered in the buffer 210. The next slice processing step corresponding to the next slice is performed based on the pixel data buffered in the buffers 212 and 210 to generate destination pixels. A plurality processing steps may be performed to all slices to make the graphics processing on the image 300 completed.

Specifically, as the slice Slice_1 locating on the boundary of the image 300 (the left side), reused pixel data of a previous slice (in a width 2*edge) does not exist. For keeping consistency of the number of destination pixels (the same pixel number of SO_1, SO_2 and SO_3), more columns are considered as the non-overlapped pixel data NO_1 in comparison with the non-overlapped pixel data NO_2 or NO_3. If the non-overlapped pixel data NO_2 or NO_3 is in a width of W (W columns of pixel data), the non-overlapped pixel data NO_1 may be set in a width of (W+2*edge).

In some exemplary embodiments, for keeping the accuracy of the slice processing step corresponding to the slice Slice_1 and the size of the buffer 212, the non-overlapped pixel data NO_1 may be set in a width of (W+edge). And a mirrored boundary in a width of an edge is generated based on the non-overlapped pixel data NO_1. The mirrored boundary and the non-overlapped pixel data NO_1 comprise pixel data in a width of (W+2*edge) for performing a slice processing step. The details of the mirrored boundary are discussed below. Before performing slice processing step corresponding to the overlapped pixel data O_12 and the non-overlapped pixel data NO_1 reading from the set of registers 206, the ALU 208 generates the mirrored boundary in a width edge based on the column of pixel data at the left side of the non-overlapped pixel data NO_1, wherein the mirrored boundary is used in the slice processing step corresponding to the slice Slice_1 to generate destination pixels SO_1. Because the slice processing step corresponding to the slice Slice_1 takes the mirrored boundary (in a width of edge) into consideration, the slice processing step corresponding to Slice_1 is based on pixel data in a width of edge+(edge+W)+2*edge, which is the same as the width of the pixel data used in the slice processing step corresponding to Slice_2 or Slice_3, keeping consistency of the number of pixel data is used in each slice processing step. In general, W is a number greater than 2*edge. In some exemplary embodiments, the image 300 may be not divided into an integer number of slices. The final slice is narrower than the other slices. For example, the final slice contains only narrower non-overlapped pixel data. The aforementioned mirrored boundary generation technology may be used for performing the slice processing step corresponding to the final slice. In an exemplary embodiment, except for the first slice and the final slice, each of the other slices contains non-overlapped pixel data in a width of W. The non-overlapped pixel data of the first slice is in a width of (W+edge). The non-overlapped pixel data of the final slice is not a fixed number. In some exemplary embodiments, the image 300 may be divided into slices from the right side to the left side. In some exemplary embodiments, the image 300 may be divided into slices horizontally. In some exemplary embodiments, the number edge is adjusted to align the data stored in the IVDN 204. For example, when the expected value of the edge is 5, the adjusted value of the edge may be 6 for actual use in the graphics processing. Thus, the value of an edge may vary between the different slices in the image 300.

Figure 4:
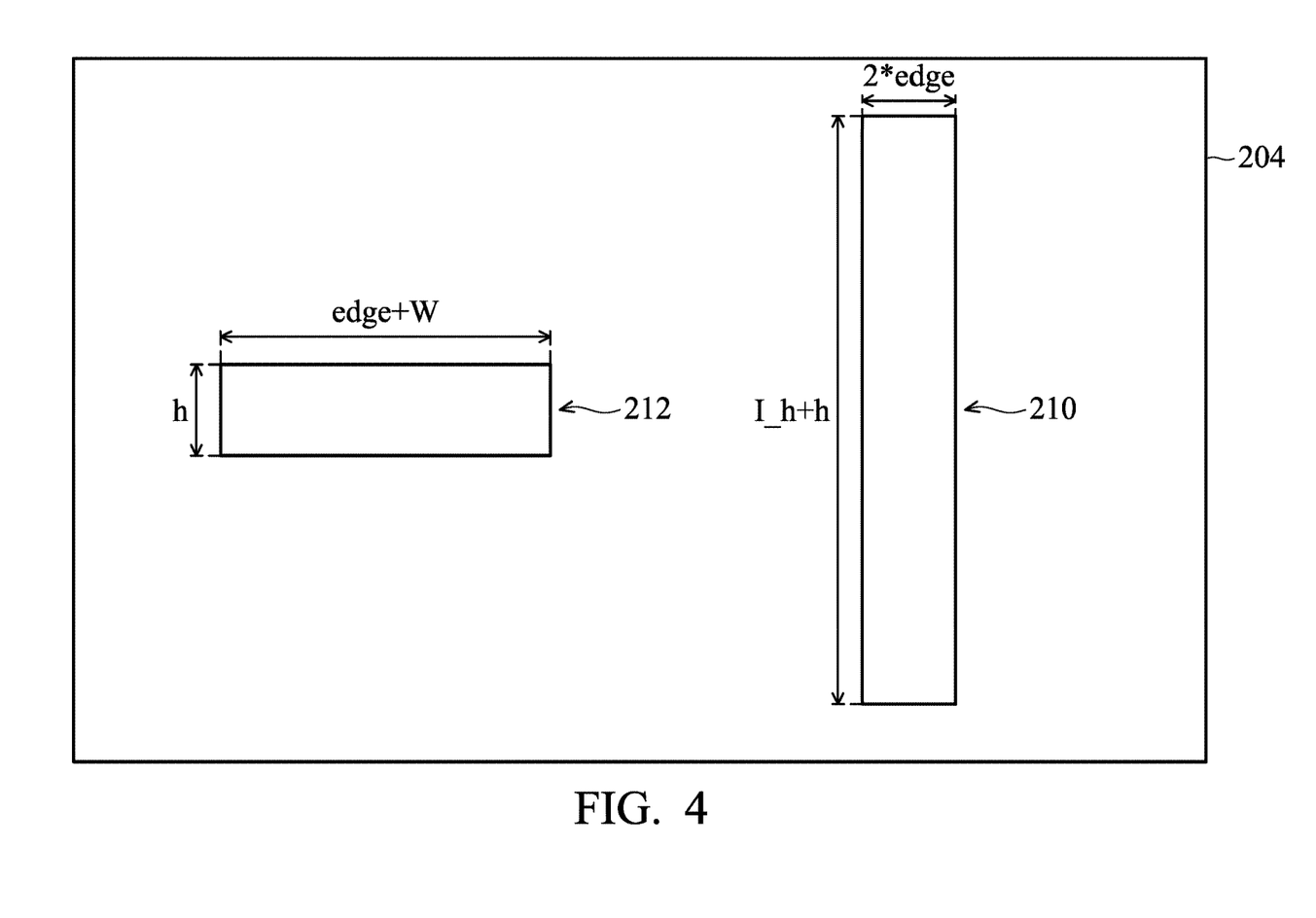
FIG. 4 illustrates the size of the buffers 210 and 212 provided by the IVDM 204 in accordance with an exemplary embodiment of the disclosure.

FIG. 4 illustrates the size of the first buffer 210 and the second buffer 212 provided by the IVDM 204 in accordance with an exemplary embodiment of the disclosure. In some exemplary embodiment, an h*w filter (or kernel or window) may be used in the graphics processing, wherein both of h (the number of rows) and w (the number of columns) of the filter are set to (2*edge+1) or 2*edge. Thus, the buffer 212 needs to buffer at least (edge+W)*h pixels, wherein the value (edge+W) is determined based on the width of the non-overlapped pixel data NO_1 of Slice_1. The value h is determined based on the height of the filter (e.g., column number of the S1N_1, S1N_2, S1N_3 shown in FIG. 3). In some exemplary embodiments, a latency value is considered in designing the buffer 212, wherein the latency value can take data alignment into consideration. In an exemplary embodiment, the image data is stored in the system memory 202 batch by batch. For example, a tile of the image is stored in the system memory 202 in each batch and each tile contains 2K bits of data. When a proper latency value is taken into consideration in the design of the buffer size, the number of pixel data retrieved from the system memory 202 and buffered in the buffer 210 and/or buffer 212 each time is an integer multiple of the batch size. In an exemplary embodiment, the size of the buffer 210 and/or buffer 212 may be set to an integer multiple of each batch. In an exemplary embodiment, the latency value may also take data real implementation of the buffers into consideration depends on the. For example, if the calculated ideal value based on (edge+W)*h is not an integer number (e.g. 7.65K bits), a latency value should be considered to provide 8K bits or even a larger space for technical implementation of the buffer 212. In such exemplary embodiments, the size of the buffer 212 is designed to provide a space for (edge+W)*h+ latency1 bits, wherein latency1 is the latency value considered in design of the buffer 212. As for the buffer 210, which is configured to buffer overlapped pixel data, the buffered pixel data may be at least (2*edge)*(I_h+h) pixels, where I_h is the number of rows of the image 300 and h (referring to the height h of the blocks S1O_1, S1O_2, S1O_3, and so on) is the height of the filter (e.g., column number of the S1N_1, S1N_2, S1N_3 shown in FIG. 3). The entire overlapped pixel data (containing 2*edge*I_h pixels) of the previous slice and a first block of overlapped pixel data (containing 2*edge)*h pixels) of the current slice may be buffered in the buffer 210 for performing the first block processing operation of the current slice. More specially, if performing block processing operation corresponding to S2N_1 and S2O_1 of the slice Slice_2, the buffer 210 buffers the overlapped pixel data O_12 (containing 2*edge*I_h pixels) of Slice_1 and the overlapped block S2O_1 (containing 2*edge*h pixels) of Slice_2. If performing block processing operation corresponding to S2N_2 and S2O_2 of the slice Slice_2, the buffer 210 buffers the overlapped pixel data containing 2*edge*(I_h−h) pixels in Slice_1 (except for overlapped block S1O_1) and the overlapped blocks S2O_1 and S2O_2 (containing 2*edge*(h+h)) of Slice_2 In conclusion, the buffer 210 may be designed to buffer at least 2*edge*(I_h+h) pixels, for performing block processing operation based on overlapped pixel data of the previous slice and overlapped pixel data of the current slice to generate a block of destination pixels. In this manner, there is no need for the graphics processing unit 200 to repeatedly load the overlapped pixel data from the system memory 202. In some exemplary embodiments, a latency value is also taken into consideration in the design of the buffer 210. The buffer 210 may be designed to provide a space for (2*edge)*(I_h+h)+latency2 bits, wherein the latency2 is the latency value for the size of the buffer 210.

The buffer 210 may be designed to buffer more than (2*edge)*I_h pixels. Without considering the latency value too much, the buffer 212 may be designed to buffer less than (edge+W)*I_h pixels. In some exemplary embodiments, for reducing the size of the buffer 212, the buffer 212 only buffer (edge+W)*h pixels, wherein h is the height of the filter.

In some exemplary embodiments, the buffered data is managed in blocks (referring to the blocks S1N_1, S1N_2, S1N_3, S2N_1, S2N_2, S2N_3, S2O_1, S2O_2, S2O_3 as shown in FIG. 3). New block of pixel data is buffered into the buffer 210 or the buffer 212 when old block of pixel data is released. For example, if performing block processing operation corresponding to S2N_2 and S2O_2 of the slice Slice_2, the buffer 212 buffers block of pixels S2N_2 after releasing block of pixels S2N_1, and the buffer 210 buffers block of pixels S2O_2 after releasing block of pixels S1O_1. The graphics processing unit 200 may access the system memory 202 via DMA (direct memory access) for loading the pixel data. When a block of pixel data is released from the buffer 210/212 or is ready for buffer another batch of pixel data, the graphics processing unit 200 transmits a DMA request to access the system memory 202, and the system memory 202 makes a DMA response to the graphics processing unit 200 after receiving the DMA request, wherein the DMA response is made based on the releasing condition of the buffer 210 or the buffer 212 of the IVDM 204. In an exemplary embodiment, a tag (e.g. a pixel coordinate) may be used to determine where a pixel locates in an image and which slice the pixel belongs to. Accordingly, it is further determined that whether the data of the pixel is overlapped or non-overlapped pixel data to further determine buffering them in the buffer 210 or the buffer 212.

In an exemplary embodiment, a vector load instruction (vdl) stored in the ALU 208 may be used to load the pixel data retrieved from the buffer 210/212 of the IVDM 204 to the set of registers 206 for calculating the destination pixels. In an exemplary embodiment, the vdl instruction may comprise an IsLastRead, for checking whether the oldest pixel data buffered in the buffer 210 or 212 is as the last input pixel transmitting to the set of registers 206, to further determine whether release the buffer 210/212 or not, wherein the releasing of buffer 210/212 may refer to release the oldest block of pixel data. And the vdl instruction may send a DMA request the system memory 202, wherein the DMA request may be transmitted to the system memory 202 and load the next block of pixel data from the system memory 202 to the buffer 210/212.

Figure 5:
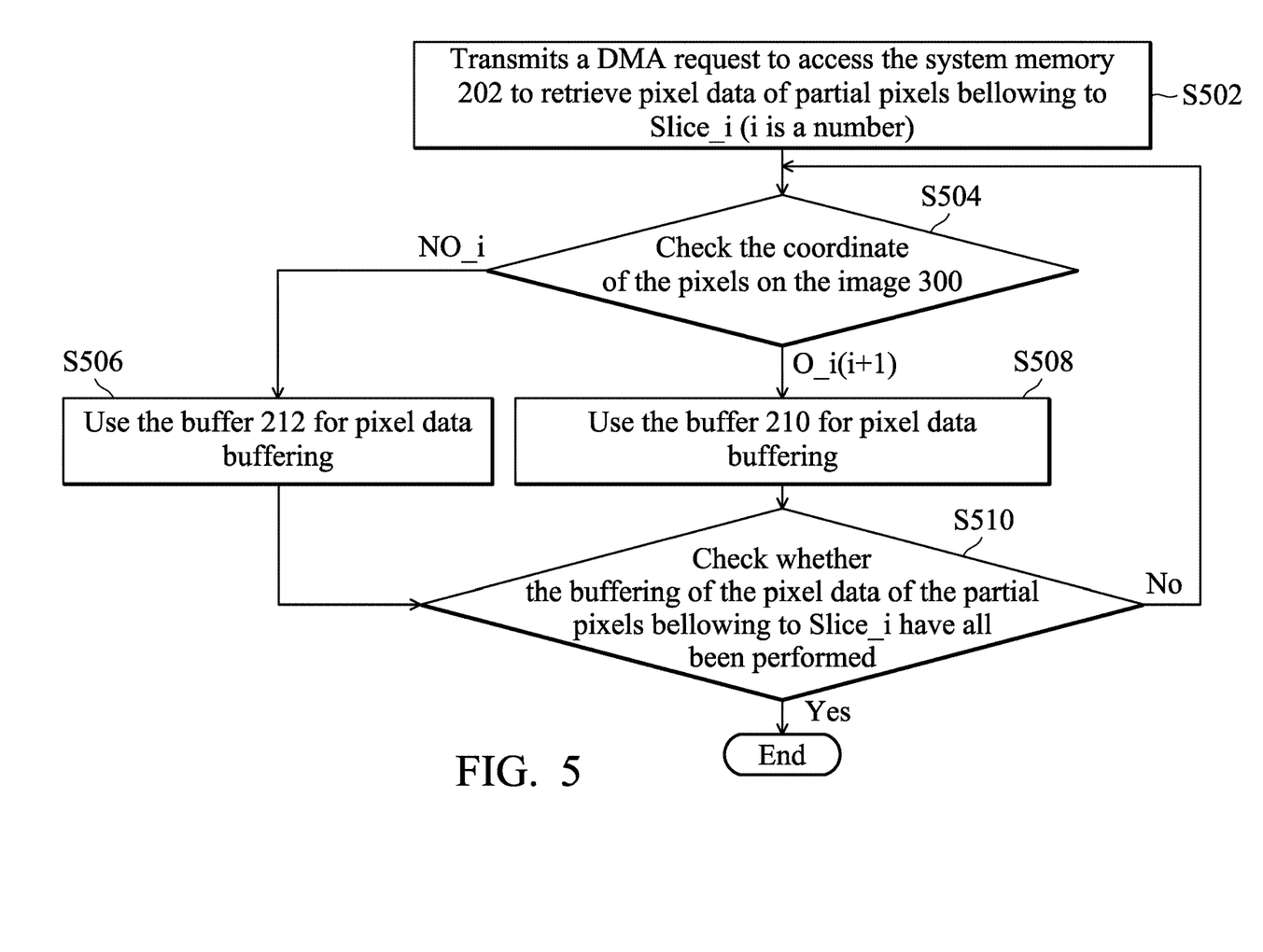
FIG. 5 is a flowchart depicting a procedure that retrieves pixel data from the system memory 202 to the buffer 210/212 in accordance with an exemplary embodiment of the disclosure and the procedure is performed based on FIG. 3.

FIG. 5 is a flowchart depicting a procedure that retrieves pixel data from the system memory 202 to the buffer 210/212 in accordance with an exemplary embodiment of the disclosure and the procedure is performed based on FIG. 3. In step S502, the graphics processing unit 200 transmits a DMA request to access the system memory 202 for retrieving part of pixel data of Slice_i (i is a number for the slice) from the system memory 202, wherein the part of pixel data of Slice_i may be the adjacent blocks of Slice_i (e.g. S2N_2 and S2O_2 of Slice2). The retrieved pixel data is analyzed to be buffered by one of the buffers 210 and 212. In step S504, the coordinate of the pixels on the image 300 is checked to determine which slice and/or block belongs to. When the pixel belongs to non-overlapped pixel data NO_i, step S506 is performed to buffer the pixel data in the buffer 212. When the pixel belongs to overlapped pixel data O_i(i+1), step S508 is performed to buffer the pixel data in the buffer 210. In step S510, it is checked i whether all pixel data retrieving from the system memory 202 by the DMA request has been buffered by the buffers 210 and 212. If not, the procedure returns to step S504.

When the DMA request transmitted in step S502 may be determined by the IsLastRead of the vdl instruction, which has been described before. When the IsLastRead confirms the oldest pixel data buffered in the buffer 210 or 212 as the last input pixel transmitting to the set of registers 206, a block of space of the buffer 210/212 is released. Another DMA request is transmitted to access the system memory 202 for loading other overlapped and non-overlapped pixel data to the internal vector dynamic memory 204.

Figure 6:
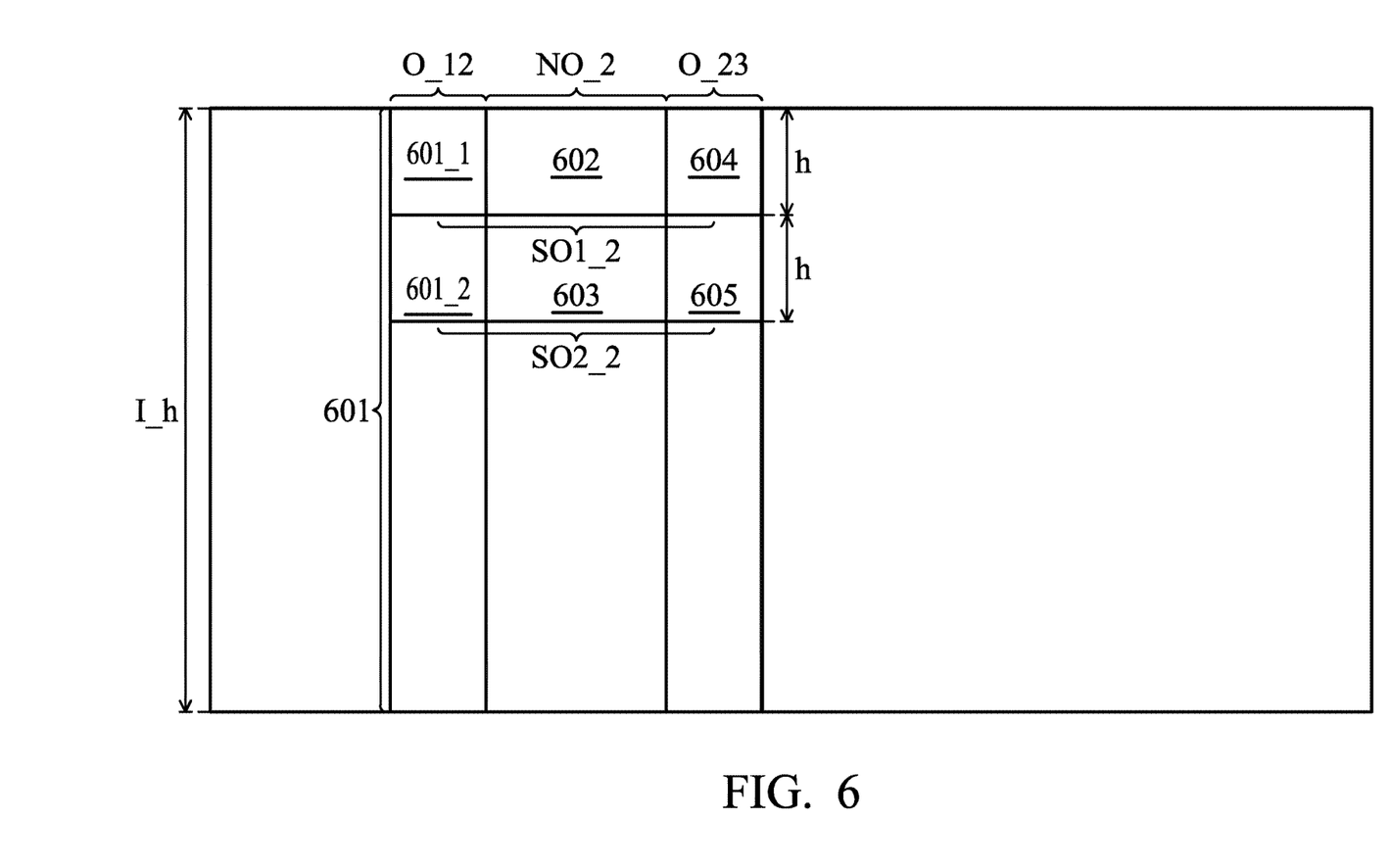
FIG. 6 depicts block processing and the update of the buffers 210 and 212 in accordance with an exemplary embodiment of the disclosure.

FIG. 6 depicts the update of the buffers 210 and 212 in accordance with an exemplary embodiment of the disclosure. The buffer 212 firstly buffers the first h lines of pixel data of the non-overlapped pixel data NO_2 (i.e. block 602, containing W*h pixels). The buffer 210 firstly buffers pixel data of all lines of the overlapped pixel data O_12 (i.e. block 601, involving 2*edge*I_h) and the first h lines of pixel data of the overlapped pixel data O_23 (i.e. block 604, involving 2*edge*h pixels). The set of registers 206 respectively load a block of pixel data 602 from the buffer 212 as well as a block of pixel data 601_1 of 601 and a block of pixel data 604 from the buffer 210, and transmit the loaded data to the ALU 208 for performing block processing operation, e.g., generating a plurality of destination pixels SO1_2. Before the block processing operation performed by the ALU 208, the ALU 208 uses IsLastRead of a vdl instruction (stored in the set of registers 206) to check whether the oldest pixel data buffered in the buffers 210 and 212 is input pixel transmitting to the set of registers. If yes, the data in the buffer 210 and the buffer 212 is updated, i.e., the block of pixel data (containing 2*edge*h pixels) 601_1 can be cleared from the buffer 210, and the block of pixel data (containing W*h pixels) 602 can be cleared from the buffer 212. When data in the buffers 210 and 212 are being released, the graphics processing unit 200 outputs a DMA request to the system memory 202 to access a block of pixel data 603 (containing W*h pixels) and a block of pixel data 605 (containing 2*edge*h pixels), and buffer the block of pixel data 603 in the buffer 212 and buffer the block of pixel data 605 in the buffer 210. The set of registers 206 respectively load a block of pixel data 603 from the buffer 212 as well as a block of pixel data 601_2 of 601 and a block of pixel data 605 from the buffer 210, and transmit the loaded data to the ALU 208 for performing block processing operation, e.g., generating a plurality of destination pixels SO2_2. In other exemplary embodiments, there are many variations in the shape of the window. The identification of overlapped or non-overlapped pixel data should be adjusted based on the shape of the window.

In other exemplary embodiments, image slicing is not limited to be performed along the x axis and may be performed along the y axis. The image may be divided into slices (slicing order) from the right side to the left side, or may be divided into slices from the left side to the right side. The image may be divided into blocks from the upward side to the downward side, or may be divided into blocks from the downward side to the upward side. There are many variations in the shape of slice, the shape of block, and slicing order. In an exemplary embodiment, the set of registers includes one or more vector registers and one or more global register. The vector register is configured to store pixel data for performing graphics processing (e.g. the aforementioned slice processing step). The global register is configured to be operated by the ALU 208 to store parameters for slicing an image, like the starting point, ending point, width and height of each slice, the starting point, ending point, width and height of each block of overlapped pixel data, and the starting point, ending point, width and height of each block of non-overlapped pixel data. In some exemplary embodiments, the parameters in the global register may be real-time updated according to user's setting.

Other techniques that use the above concepts in graphics processing are within the scope of the disclosure. Based on the above contents, the present invention further relates to a method for graphics processing.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A graphics processing unit, comprising:
   an internal vector dynamic memory, buffering a slice of pixel data of a plurality of slices of pixel data of an image loaded from a system memory, wherein the slice of pixel data includes non-overlapped pixel data and overlapped pixel data; and
   an arithmetic logic unit, performing a current slice processing step corresponding to the slice of pixel data,
   wherein:
   the graphics processing unit performs a series of slice processing steps corresponding to the plurality of slices of pixel data to complete graphics processing of the image;
   the internal vector dynamic memory includes a first buffer and a second buffer;
   the first buffer is configured to buffer the non-overlapped pixel data, which is not reused in a next slice processing step corresponding to a next slice of pixel data;
   the second buffer is configured to buffer the overlapped pixel data, which is reused in the next slice processing step corresponding to the next slice of pixel data without being acquired from the system memory again; and
   the graphics processing unit retrieves pixel data from the system memory to the internal vector dynamic memory, wherein the pixel data retrieved each time belongs to the same slice.

2. The graphics processing unit as claimed in claim 1, comprising:
   the second buffer is configured to buffer overlapped pixel data of a previous slice, and the overlapped pixel data of the previous slice will be reused in the current slice processing step.

3. The graphics processing unit as claimed in claim 1, wherein:
   the series of slice processing steps includes a first slice processing step corresponding to a first slice of pixel data and a second slice processing step corresponding to a second slice of pixel data, wherein the first slice processing step is performed prior to the second slice processing step;
   when the arithmetic logic unit performs the first slice processing step, the first buffer buffers non-overlapped pixel data of the first slice of pixel data and the second buffer buffers overlapped pixel data of the first slice of pixel data; and
   when the arithmetic logic unit performs the second slice processing step, the first buffer releases non-overlapped pixel data of the first slice of pixel data and buffers non-overlapped pixel data of the second slice of pixel data, and the second buffer buffers overlapped pixel data of the first slice of pixel data and overlapped pixel data of the second slice of pixel data.

4. The graphics processing unit as claimed in claim 1, wherein:
   pixel data is buffered by the first buffer or the second buffer depending on its coordinate in the image.

5. The graphics processing unit as claimed in claim 1, wherein:
   the slice of pixel data includes a plurality of blocks of pixel data, wherein each block of pixel data is a block of overlapped pixel data or a block of non-overlapped pixel data;
   the arithmetic logic unit performs a series of block processing operations to complete the slice processing corresponding to the slice of pixel data; and
   for a block processing operation, the first buffer buffers a block of non-overlapped pixel data, the second buffer buffers a block of overlapped pixel data of the previous slice and a block of overlapped pixel data of the current slice, and the second buffer further stores blocks of pixel data to be reused for the latter block processing.

6. The graphics processing unit as claimed in claim 1, wherein:
   the second buffer at least buffers (2*edge)*(I_h+h) pixels;
   edge presents the number of columns of a window edge;
   I_h is the number of rows of the image; and
   h is the number of rows of the window.

7. The graphics processing unit as claimed in claim 1, wherein:
   the first buffer buffers up to (edge+W)*h pixels;
   edge presents the number of columns of a window edge;
   W is the number of columns of non-overlapped pixel data of a center slice; and
   h is the number of rows of the window.

8. The graphics processing unit as claimed in claim 1, wherein:
   the plurality of slices of pixel data of the image includes a first slice of pixel data and a second slice of pixel data; and the number of columns of the first slice of pixel data is greater than the number of columns of the second slice of pixel data by at least one edge, wherein the edge presents the number of columns of a window edge.

9. The graphics processing unit as claimed in claim 8, wherein:
the arithmetic logic unit further generates a mirrored boundary, wherein the mirrored boundary is combined with the first slice of pixel data for performing the slice processing step corresponding to the first slice of pixel data.

10. The graphics processing unit as claimed in claim 1, further comprising:
a set of registers, operated according to a vector load instruction;
the arithmetic logic unit uses the vector load instruction to load pixel data to the set of registers;
according to the vector load instruction, the pixel data written to the set of registers is checked to determine whether the oldest pixel data buffered in the first buffer is as the last input pixel transmitting to the set of registers to further determine whether release the first buffer or not; and
according to the vector load instruction, the pixel data written to the set of registers is checked to determine whether the oldest pixel data buffered in the second buffer is as the last input pixel transmitting to the set of registers, to further determine whether release the second buffer or not.

11. The graphics processing unit as claimed in claim 10, wherein:
the set of registers includes a global register; and
the global register stores parameters for slicing an image, and the parameters indicate starting points, ending points, and width and height information of overlapped pixel data and non-overlapped pixel data of each slice of pixel data.

12. A method for graphics processing, comprising:
providing an internal vector dynamic memory within a graphics processing unit to buffer a slice of pixel data of a plurality of slices of pixel data of an image loaded from a system memory, wherein the slice of pixel data includes non-overlapped pixel data and overlapped pixel data; and
performing a current slice processing step corresponding to the slice of pixel data,
wherein:
a series of slice processing steps corresponding to the plurality of slices of pixel data are performed to complete graphics processing of the plurality of slices of pixel data of the image;
the internal vector dynamic memory includes a first buffer and a second buffer;
the first buffer is configured to buffer non-overlapped pixel data, which is not reused in a next slice processing step corresponding to a next slice of pixel data;
the second buffer is configured to buffer overlapped pixel data, which is reused in the next slice processing step corresponding to the next slice of pixel data without being acquired from the system memory again; and the graphics processing unit retrieves pixel data from the system memory to the internal vector dynamic memory, wherein the pixel data retrieved each time belongs to the same slice.

13. The method as claimed in claim 12, comprising:
the second buffer is configured to buffer overlapped pixel data of a previous slice, and the overlapped pixel data of the previous slice will be reused in the current slice processing step.

14. The method as claimed in claim 12, wherein:
the series of slice processing steps includes a first slice processing step corresponding to a first slice of pixel data and a second slice processing step corresponding to a second slice of pixel data, wherein the first slice processing step is performed prior to the second slice processing step.

15. The method as claimed in claim 12, wherein:
pixel data is buffered by the first buffer or the second buffer depending on its coordinate in the image.

16. The method as claimed in claim 12, wherein:
the second buffer at least buffers (2*edge)*(I_h+h) pixels;
edge presents the number of columns of a window edge;
I_h is the number of rows of the image; and
h is the number of rows of the window.

17. The method as claimed in claim 12, wherein:
the first buffer buffers up to (edge+W)*h pixels;
edge presents the number of columns of a window edge of a window after performing a window processing;
W is the number of columns of non-overlapped pixel data of a center slice; and
h is the number of rows of the window.

18. The method as claimed in claim 12, wherein:
the plurality of slices of pixel data of the image includes a first slice of pixel data and a second slice of pixel data; and
the number of columns of the first slice of pixel data is greater than the number of columns of the second slice of pixel data by at least one edge, wherein the edge presents the number of columns of a window edge.

19. The method as claimed in claim 12, further comprising:
providing a set of registers, which is operated according to a vector load instruction; and
using the vector load instruction to load pixel data to the set of registers,
wherein:
according to the vector load instruction, the pixel data written to the set of registers is checked to determine whether the oldest pixel data buffered in the first buffer is as the last input pixel transmitting to the set of registers to further determine whether release the first buffer or not, and
according to the vector load instruction, the pixel data written to the set of registers is checked to determine whether the oldest pixel data buffered in the second buffer is as the last input pixel transmitting to the set of registers to further determine whether release the second buffer or not.

* * * * *